United States Patent
Yamamoto

(10) Patent No.: US 8,906,274 B2
(45) Date of Patent: Dec. 9, 2014

(54) SEALING MATERIAL AND METHOD FOR PREPARING THE SAME

(75) Inventor: Tomohiro Yamamoto, Yokohama (JP)

(73) Assignee: Bridgestone Corporation, Tokyo (JP)

(*) Notice: Subject to any disclaimer, the term of this patent is extended or adjusted under 35 U.S.C. 154(b) by 164 days.

(21) Appl. No.: 13/322,326

(22) PCT Filed: May 21, 2010

(86) PCT No.: PCT/JP2010/058601
§ 371 (c)(1),
(2), (4) Date: Nov. 23, 2011

(87) PCT Pub. No.: WO2010/137524
PCT Pub. Date: Dec. 2, 2010

(65) Prior Publication Data
US 2012/0077016 A1    Mar. 29, 2012

(30) Foreign Application Priority Data
May 25, 2009   (JP) .................... 2009-124845

(51) Int. Cl.
| | | |
|---|---|---|
| *B32B 3/26* | (2006.01) | |
| *C08J 9/06* | (2006.01) | |
| *C08J 9/10* | (2006.01) | |
| *C09K 3/10* | (2006.01) | |
| *C08J 9/38* | (2006.01) | |
| *B29C 44/56* | (2006.01) | |
| *C08J 9/00* | (2006.01) | |
| *C08K 5/098* | (2006.01) | |
| *C08K 3/30* | (2006.01) | |
| *C08L 23/16* | (2006.01) | |

(52) U.S. Cl.
CPC ............ *C08J 9/0023* (2013.01); *C08J 2323/16* (2013.01); *C08J 2203/04* (2013.01); *C09K 2200/0642* (2013.01); *C08J 9/103* (2013.01); *C09K 3/10* (2013.01); *C08K 3/30* (2013.01); *C08J 9/38* (2013.01); *C08L 23/16* (2013.01); *B29C 44/5627* (2013.01); *C09K 2200/0447* (2013.01); *C08K 5/098* (2013.01)
USPC .......................................... 264/54; 428/304.4

(58) Field of Classification Search
CPC ................................. C08J 2323/16; C08J 9/38
See application file for complete search history.

(56) References Cited

U.S. PATENT DOCUMENTS

| | | | | |
|---|---|---|---|---|
| 5,677,382 | A * | 10/1997 | Tsuji et al. | 525/237 |
| 6,013,362 | A * | 1/2000 | Takahashi et al. | 428/304.4 |
| 2006/0142452 | A1* | 6/2006 | Wolters et al. | 524/394 |
| 2011/0233449 | A1* | 9/2011 | Lunghi et al. | 252/62 |

FOREIGN PATENT DOCUMENTS

| | | |
|---|---|---|
| CN | 1407012 A | 4/2003 |
| CN | 101289553 A | 10/2008 |
| JP | 59-161439 A | 9/1984 |
| JP | 08-302335 A | 11/1996 |

(Continued)

*Primary Examiner* — Randy Gulakowski
*Assistant Examiner* — Christina Wales
(74) *Attorney, Agent, or Firm* — Sughrue Mion, PLLC

(57) ABSTRACT

A sealing material is provided, which has excellent sealing property, with cracks, fracture, and deformation being minimized. The sealing material of the invention is prepared by vulcanizing and foaming a mixture containing a rubber component containing a copolymer rubber of ethylene, an α-olefin having 3 or more carbon atoms, and a non-conjugated diene, a vulcanizing agent, and a blowing agent, and then subjecting the mixture to a cell breakage treatment, characterized in that the mixture further includes a fatty acid calcium salt and a fatty acid zinc salt.

14 Claims, 2 Drawing Sheets

(56) References Cited

FOREIGN PATENT DOCUMENTS

| | | | |
|---|---|---|---|
| JP | 2001-311070 A | | 11/1996 |
| JP | 08302335 A | * | 11/1996 |
| JP | 11-080405 A | | 3/1999 |
| JP | 2000-001558 A | | 1/2000 |
| JP | 2000-313762 A | | 11/2000 |
| JP | 2001-064429 A | | 3/2001 |
| JP | 2002-080627 A | | 3/2002 |
| JP | 2002-146072 A | | 5/2002 |
| JP | 2005-036053 A | | 2/2005 |

* cited by examiner

SEALING MATERIAL AND METHOD FOR PREPARING THE SAME

CROSS REFERENCE TO RELATED APPLICATIONS

This application is a National Stage of International Application No. PCT/JP2010/058601 filed May 21, 2010, claiming priority based on Japanese Patent Application No. 2009-124845 filed May 25, 2009, the contents of all of which are incorporated herein by reference in their entirety.

FIELD OF THE INVENTION

The present invention relates to a sealing member to be provided between members for sealing a gap between the members, and particularly relates to a sealing member comprising ethylene-α-olefin-diene copolymer rubber foam.

BACKGROUND ART

Hitherto, a gap between members formed in constructs such as buildings, vehicles, electronic devices is filled with a sealing material, to provide water cut-off, heat insulation and sound absorption. Foams made of synthetic resins or rubbers are used for the sealing materials. The foams have appropriate repulsive force (compression stress). Therefore, the foams adhere, due to compliance, to the irregularity on the surface of the members to be sealed, under application of small compression deformation. Accordingly, an excellent seal property can be attained.

Above all, a rubber foam obtained by expanding ethylene-α-olefin-diene copolymer rubber foam by using a blowing agent such as azodicarboxylic acid amide is preferably used as a sealing material, because of excellent weather resistance, heat resistance and seal properties (Patent Literature 1 and 2). In the rubber foam, the smaller the cell diameter or the higher the cell density, the more improved the properties required by the foam (water cut-off property, heat insulation property, sound absorption property, etc). Therefore, the rubber foam is subjected to bubble control by use of a cell diameter control agent such as stearic acid.

The rubber foam prepared by use of a blowing agent mainly includes a closed cell structure. Therefore, the foam tends to have low dimensional stability and flexibility, and sometimes does not have sufficient seal properties. As a countermeasure, the closed-cells in the rubber foam are broken in accordance with cell breakage treatment such as roll crush and vacuum crush, to produce a rubber foam having open-cell structure.

PRIOR ART LITERATURE

Patent Literature

Patent Literature 1: JP-A 2000-313762
Patent Literature 2: JP-A 2001-64429

DISCLOSURE OF THE INVENTION

Problems to be Solved by the Invention

However, the rubber foam having fine cells with a high density, that is, for sufficiently obtaining properties such as water cut-off property, does not have a satisfactory rigidity or tensile strength. Therefore, not only cracks or fracture, but also deformation occurs due to the cell breakage treatment.

It is therefore an object of the present invention to provide a sealing material having excellent sealing properties, with cracks, fracture, or deformation due to the cell breakage treatment being minimized.

Means for Solving the Problems

It is considered that the above-mentioned decrease in the rigidity or tensile strength of the rubber foam is caused by stearic acid used as a cell diameter control agent. The inventor of the present invention has found that the above-discussed problem can be solved by using a fatty acid calcium salt and a fatty acid zinc salt in combination as a cell diameter control agent.

In other words, the present invention relates to a sealing material obtained by vulcanizing and blowing a mixture comprising a rubber component comprising ethylene-α-olefin-diene copolymer rubber, a vulcanizing agent, and a blowing agent, and thereafter subjecting the mixture to cell breakage treatment, characterizing in that the mixture further comprises a fatty acid calcium acid and a fatty acid zinc acid.

Effect of the Invention

The combined use of a fatty acid calcium salt and a fatty acid zinc salt makes it possible to obtain a rubber foam having fine cells with a high density, in addition to excellent rigidity and tensile strength. The rubber foam having excellent rigidity and tensile strength can be easily subjected to cell breakage treatment, from which a sealing material without cracks caused by cell breakage treatment, fracture, or deformation can be obtained. Further, since the rubber foam has fine and uniform cells a high density, a sealing agent having excellent properties such as sealing property, water cut-off property, heat insulation property, sound absorption property, with good cost performance can be obtained.

EMBODIMENT FOR CARRYING OUT THE INVENTION

Figure 1:
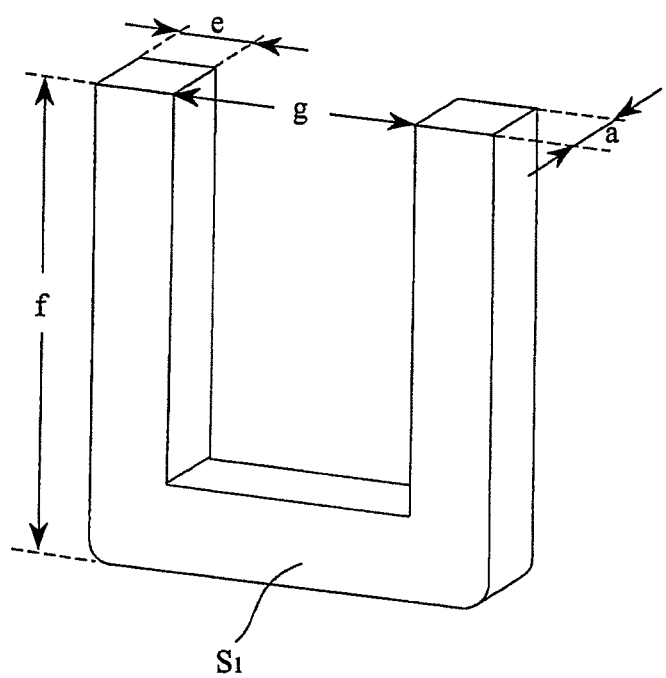
FIG. 1 is a perspective view of a U-shaped sample to be used for evaluating water cut-off property.

The sealing material of the invention is prepared by vulcanizing and foaming a mixture comprising a rubber component comprising ethylene-α-olefin-diene copolymer rubber, a vulcanizing agent, a blowing agent, and a cell diameter control agent to give a rubber foam, and then subjecting the rubber foam to cell breakage treatment.

[Cell Diameter Control Agent]

As a cell diameter control agent, a fatty acid calcium salt and a fatty acid zinc salt are used for a rubber foam. Accordingly, a rubber foam having fine cells with a high density is obtained without decreasing mechanical strength such as tensile strength and rigidity.

Fatty acid calcium salts are preferably those having 12 or more carbon atoms, in particular 12 to 22 carbon atoms. Specific examples of the fatty acid calcium salt are calcium laurate, calcium tridecanoate, calcium myristate, calcium pentadecanoate, calcium palmitate, calcium heptadecanoate, calcium stearate, calcium isostearate, calcium 12-hydroxystearate, calcium oleate, calcium nonadecanoate, calcium icosanoate, calcium henicosanoate, and calcium behenate.

Among these, calcium salts of straight-chain saturated fatty acid having 12 to 18 carbon atoms are preferable, and calcium stearate is particularly preferable.

Examples of the fatty acid zinc salt are those having 12 or more carbon atoms, particularly 12 to 22 carbon atoms. Specific examples of the fatty acid zinc salt are zinc laurate, zinc tridecanoate, zinc myristate, zinc pentadecanoate, zinc palmitate, zinc heptadecanoate, zinc stearate, zinc isostearate, zinc 12-hydroxystearate, zinc oleate, zinc nonadecanoate, zinc icosanoate, zinc henicosanoate, and zinc behenate. Among these, zinc salts of straight-chain saturated fatty acid having 12 to 18 carbon atoms are particularly preferable. The above-discussed effect can be particularly obtained by using calcium stearate and zinc stearate in combination.

It is preferable that the content of the fatty acid calcium salt is in the range of 0.1 to 6.0 parts by weight, particularly in the range of 0.5 to 5.0 parts by weight, based on 100 parts by weight of the rubber component. When the content of the fatty acid calcium salt is too small, tensile strength durable for the cell breakage treatment may not be obtained. When the content of the fatty acid calcium salt is 6.0 or more, a lot of pin holes having a diameter of about 1 mm or more may be incorporated in the material.

It is preferable that the content of the fatty acid zinc salt is in the range of 0.1 to 5.0 parts by weight, particularly in the range of 0.5 to 5.0 parts by weight, based on 100 parts by weight of the rubber component. When the content of the fatty acid calcium salt is too small, fine cells may not be obtained. When the content of the fatty acid calcium salt is too large, the cell diameters become too small that makes the rigidity of the rubber foam increased, and hence the cell breakage treatment becomes difficult.

The weight ratio ($W_2/W_1$) of fatty acid zinc salt ($W_2$) to fatty salt calcium salt ($W_1$) is preferably in the range of 0.02 to 50, in particular in the range of 0.2 to 10. When the weight ratio overpasses 50, the rigidity of the rubber foam can be too large to properly perform the cell breakage treatment. On the other hand, when weight ratio is smaller than 0.02, tensile strength durable for the cell breakage treatment may not be sufficiently obtained.

For preparing a rubber foam, it is preferable not to use stearic acid as a cell diameter control agent. For further minimizing the cell diameter, however, it is possible to use a small amount of stearic acid. In such a case, stearic acid is contained in an amount of 3.0 parts by weight or less, particularly in the range of 0.1 to 3.0 parts by weight. When the content of stearic acid exceeds 3.0 parts by weight, the rubber foam may have a decreased mechanical strength, to cause cracks fracture and deformation, due to cell breakage treatment.

[Rubber Component]

The rubber component comprises at least ethylene-α-olefin-diene copolymer rubber. The ethylene-α-olefin-diene copolymer rubber is a copolymer of ethylene, an α-olefin and a non-conjugated diene.

As α-olefins, those having 3 or more carbon atoms, preferably those having 3 to 20 carbon atoms are used. Specific examples include propylene, 1-butene, 4-methyl-1-pentene, 1-hexene, 1-octene, 1-decene, 1-dodecene, 1-tetradecene, 1-hexadecene, 1-octadecene, and 1-eicocene. The use of propylene is particularly preferable.

As the non-conjugated diene, it is possible to use 1,4-hexadiene, 1,6-octadiene, 1,7-octadiene, 1,8-nonadiene, 1,9-decadiene, 2-methyl-1,5-hexadiene, 6-methyl-1,5-hexadiene, 7-methyl-1,6-octadiene, cyclohexadiene, dicyclopentadiene, methylterahydroindene, 5-vinyl-2-norbornene, 5-ethylidene-2-norbornene, and 5-methylene-2-norbornene. Among these materials, 5-ethylidene-2-norbornene is preferably used for remarkably obtaining the above-discussed effect due to the use of a fatty acid calcium salt and a fatty acid zinc salt in combination.

Ethylene-α-olefin-diene copolymer rubber is preferably ethylene-propylene-diene copolymer rubber (EPDM). The non-conjugated diene content in the EPDM is preferably in the range of 2 to 20% by weight, particularly in the range of 3 to 15% by weight. The application of the EPDM helps to control the occurrence of cracks and fracture when the foam is subjected to the cell breakage treatment.

Ethylene-α-olefin-diene copolymer rubber is included in the rubber component, preferably in an amount of 20% by weight or more, particularly 25% by weight or more, based on the total weight of the rubber component. Accordingly, a sealing material is obtained, which has fine cells with a high density, and excellent properties such as heat resistance property, sound absorption property, and water cut-off property.

As a rubber component used in addition to the ethylene-α-olefin-diene copolymer rubber, ethylene-propylene rubber (EPM), butyl rubber (IIR), isoprene rubber (IR), natural rubber (NR), styrene-butadiene rubber (SBR), butadiene rubber (BR), 1,2-polybutadiene (RB), acrylic rubber (ACM, ANM), chlorosulfonatd polyethylene (CSM), chloropropylene (CR), silicone rubber or the like can be used. Among these, EPM, and IIR are preferably used.

[Blowing Agent]

A blowing agent is used not only for gas generation for foaming, but also used for vulcanization control with respect to the rubber component. Examples of the blowing agent include dinitropentamethylenetetramine (DPT), azodicarbonamide (ADCA), 4,4'-oxybisbenzenesulfonylhydrazide (OBSH), and sodium bicarbonate. Among these material, ADCA is particularly preferably used, since excellent effect can be obtained by ADCA when used in combination with fatty acid calcium salt and fatty acid zinc salt.

It is preferable that the content of the blowing agent is in the range of 5 to 50 parts by weight, particularly in the range of 15 to 30 parts by weight, based on 100 parts by weight of rubber component.

[Vulcanizing Agent]

Examples of the vulcanizing agent are sulfur, sulfur compound, zinc flower, selenium, magnesium oxide, and organic peroxide. With the foamability of the foam taking into account, the use of at least sulfur is preferable.

The content of the vulcanizing agent is preferably in the range of 1 to 30 parts by weigh, particularly in the range of 3 to 20 parts by weight based on 100 parts by weight of the rubber component.

In the present invention, the term "vulcanization" is not understood to be limited to bridging by using sulfur, but is used as a synonym of "crosslinkage".

[Others]

The mixture used in the rubber foam may include a further additive, depending on the object. For instance, a vulcanization promoter such as thiazole promoter, dithiocarbamate promoter, thiourea promoter dithiophosphite promoter, and thiurum-based vulcanization promoting agent, a vulcanization promoting auxiliary such as zinc oxide (activated zinc flower) are used.

It is also possible to use a resin softener such as paraffin oil, process oil, blow asphalt, polybutene, rosin, or rosin ester; a filler such as calcium carbonate, magnesium carbonate, silicic acid or silicic acid salts, talk, clay, mica flour, bentonite, carbon black, silica, aluminum hydroxide, magnesium hydroxide, alumina, aluminum silicate, acetylene black, aluminum flour, ceramic, glass fiber, wood flour, or waste textile; and anti-aging agent, antioxidant, pigment, coloring agent, and anti-mold agent, etc. One or more of these additives can be added to the mixture, if necessary. Carbon black can be used also as a reinforcement agent.

Among the above-mentioned substances, a resin softener is preferably used, since a rubber foam, which has excellent mechanical strength and excellent adhesion with respect to a surface to be sealed, can be obtained. The content of the resin softener is preferably in the range of 50 to 100 parts by weight, based on 100 parts by weight of the rubber content.

[Preparation Method]

For preparing a sealing material according to the present invention, a mixture comprising a rubber component comprising a copolymer rubber of ethylene, an α-olefin having 3 or more carbon atoms, and a non-conjugated diene, a vulcanizing agent, a blowing agent, a fatty acid calcium salt, and a fatty acid zinc salt is vulcanized and foamed, and then subjecting the mixture to a cell breakage treatment. More precisely, the above-mentioned mixture/formulation is kneaded, and then the mixture is formed into a desired shape, and the thus obtained form is vulcanized and foamed. Accordingly, a rubber foam is obtained, which has a closed cell structure. Thereafter, the rubber foam is subjected to a cell breakage treatment. Thus, a sealing member of the present invention is obtained.

For preparing the rubber form, the mixture which does not contain a blowing agent, vulcanization auxiliary, vulcanizing agent, and a cell diameter control agent such as a fatty acid calcium salt and a fatty acid zinc salt is kneaded. The kneading is carried out by use of Banbury mixer, kneader, or an enclosed mixer such as Intermix. It is preferable to perform the kneading at a temperature in the range of 80 to 170° C., particularly at a temperature in the range of 90 to 140° C., for 2 to 20 minutes. After kneading, a blowing agent, a vulcanization promoting auxiliary, a vulcanizing agent, and a cell diameter control agent are added to the mixture, and the mixture is kneaded. The kneading at this stage is performed preferably at a temperature in the range of 40 to 90° C., particularly at a temperature in the range of at 50 to 80° C. for 5 to 30 minutes. The thus obtained kneaded mixture is formed to have a desired shape such as a sheet shape by a calender machine, or an extruder, etc.

The kneaded substance is formed to have a desired shape, and then introduced to a vulcanization apparatus. The kneaded substance is heated at a temperature in the range of 130 to 270° C., in particular at a temperature in the range of 140 to 200° C. for 1 to 30 minutes to vulcanize and foam the kneaded substance. In accordance with this treatment, a foam having a closed cell structure is obtained. Heat application is carried out in a vulcanization vessel, by using heat application means such as a hot air vulcanizing vessel (HAV), glass beads fluidized bed, microwave vulcanization machine (UHF), or steam. Herein, vulcanization and foaming can be carried out simultaneously, or successively under different temperature conditions.

In vulcanization and foaming, it is preferable to set the expansion ratio of the rubber foam (density ratio of the mixture before and after foaming) having a closed cell structure in the range of 10 to 30 times, particularly in the range of 10 to 20 times, based on the original size. Based on the expansion ratio, a rubber form with a appropriate mechanical strength is obtained.

The rubber foam, which has been prepared by the vulcanization and foaming, has a closed cell structure. The cells in the rubber foam having a closed cell structure are fine/minute, and the rubber foam has a high density. Further, the rubber foam is easily subjected to cell breakage treatment, because of the appropriate rigidity and tensile strength. Accordingly, a sealing material having excellent properties such as sealing property, water cut-off property, sound insulation property, and heat insulation property can be obtained.

The mean diameter of the cell in the rubber foam having a closed cell structure is in the range of 400 to 2500 μm, particularly in the range of 700 to 1000 μm. The above-mentioned mean diameter of the cell is a value measured in accordance with ASTM D 3576-77.

The number of the cell in the rubber foam having a closed cell structure is in the range of 10 to 60/25 mm, in particular in the range of 25 to 35/25 mm. Here, the number of the cell is defined as that prescribed in JIS K 6767 (1999), namely the number of the cell per 25 mm of the foam.

The rubber foam with a closed cell structure has 80% compression rigidity in a thickness direction of the foam at 25° C. in the range of 8 to 25 kPa, particularly in the range of 10 to 20 kPa. Here, 80% compression rigidity is a value measured pursuant to JIS K6767.

Moreover, the rubber foam with a closed cell structure has a tensile strength of 300% elongated in a longitudinal direction of the foam in the range of 55 to 100 kPa, particularly in the range of 60 to 80 kPa. Here, the tensile strength is a value measured pursuant to JIS K6767 (A method).

The cell breakage treatment of the rubber foam with a closed cell structure is carried out by breaking at least a part of the closed cells so that the cells communicate with each other. By the cell breakage treatment, an open cell structure is obtained in the rubber foam. The cell breakage treatment is carried out by using a known method. For example, the rubber foam is treated by being placed between a pair of rotatable rollers and compressed by the rollers (roll crush method), or by being placed between a pair of plates and compressed by the plates. Alternatively, the rubber foam is compressed under vacuum conditions, or punched by a number of needles by using, e.g. a needle punch. Among these method, roll crush method is preferably used so as to ensure cell breakage.

More specifically, the roll crush method is carried out by applying a compression deformation to rubber foam having a closed cell structure in a thickness direction of the rubber foam by use of a pair of rotatable rollers. The compression to ensure the open cell structure is increased when a number of small needles are provided on the surface of the rotatable rollers, or when a roller/rollers having numerous small needles or needle punch(es) is/are additionally provided at a location ahead or behind the pair of rotatable rollers.

The rubber foam with the closed cell structure is compressed to a thickness preferably 1/10 to 1/2, particularly preferably 1/5 to 1/2, compared to the original thickness. The cell breakage treatment can be conducted a plurality of times by using a plurality of pairs of rollers. Here, the distance between a pair of rollers can be different from the distance between a different pair of rollers. The diameter of each roller is preferably 5 cm or more. The rotational speed of a roller is in the range of 3 to 70 m/min, particularly preferably in the range of 25 to 50 m/min. It is possible to change the rotational speed of at least one of the rollers in the pair of rollers, for improving the efficiency of the cell breakage treatment.

The ratio of the closed cell structure in the sealing material after the open cell structure is obtained by the cell breakage treatment is 20% or less, particularly 1 to 10%. In other words, a high open cell ratio is obtained. The open cell ratio here is a value measured pursuant to a method prescribed in ASTM D2856.

The density (weight/volume) of the sealing material after the open cell structure is given is in the range of 0.02 to 0.2 g/cm$^3$, in particular 0.03 to 0.12 g/cm$^3$. The sealing material has a low density because fine cells are highly dispersed in the sealing material to have a low density. Consequently, the sealing material can be obtained with a excellent cost performance. Here, the density is a value measured in accordance with a method prescribed in JIS K 7222.

For sealing a gap formed between members, the sealing material of the present invention is applicable, for instance, to a window-dam in vehicles; electric installations such as air-conditioner, washing machine, refrigerator, and vending machine; audio equipments; outer wall joint, sash, roof joint parts in architecture, housing equipment such as kitchen apparatus, modular bath, and water heater; joint in structures, roads, bridges or joint part of waterway in construction work. Moreover, the sealing material is used for dust-proof, heat insulation, sound insulation, vibration-proof, shock absorption, watertight, and airtight purposes. For instance, the sealing material can be used as a dust-proof material, a heat insulator, a sound insulator, a vibration insulator, a shock absorber, and a filler.

The sealing material preferably has a sheet-shape. It is possible to apply an adhesive agent or a double-sided tape at least on one surface of the sealing material, to have an exfoliate paper to the surface. The thickness of the sealing material is decided depending on the usage, and preferably in the range of 20 to 100 mm.

EXAMPLES

The present invention will now be explained by referring to Examples. The present invention is not restricted to the following Examples.

Examples 1 to 8

In the formulation of a mixture shown in Table 1, the components in the mixture except for a blowing agent, a cell diameter control agent, a vulcanizing agent and a vulcanization promoter were mixed by a kneader at 130° C. for 10 minutes. Subsequently, the kneaded mixture was left to cool to have a surface temperature of 25° C., to which a blowing agent, a cell diameter control agent, a vulcanizing agent and a vulcanization promoter were further added and kneaded at 90° C. for 7 minutes by a kneader. Then, the resultant kneaded mixture was formed to have a sheet form, through an extruder for rubbers. The formed mixture was introduced to a heating furnace, and vulcanized and expanded at 170° C. for 60 minutes, whereby a rubber foam having a closed cell structure was obtained (thickness: 50 mm, mean cell diameter: 800 μm, cell number 30/25 mm).

Thereafter, rubber foams with a closed cell structure were successively placed between a pair of rotatable rollers (diameter: 15 cm, rotational speed of rollers: 10 m/min, distance between rollers: 20 mm), to crush the foams in the thickness direction thereof. As a result, sealing materials composed of the rubber foams with a open cell structure were obtained.

Following is the detail of the components in the formulation in Table 1. Detailed description for the other usual components will be omitted.

EPDM (Esprene (Trademark) 501A, manufactured by Sumitomo Chemical Company, Limited; ethylene content: 52% by weight, diene (5-ethylidene-2-norbornene) content: 4% by weight)

Calcium stearate ($Ca(C_{17}H_{35}COO)_2$, Seido Chemical Industry Co., Ltd.)

Zinc stearate ($Zn(C_{17}H_{35}COO)_2$, Seido Chemical Industry Co., Ltd)

Stearic acid ($C_{17}H_{35}COOH$, Stearic acid 50S, manufactured by New Japan Chemical Co., Ltd.)

Process oil (Diana (Trademark) Process oil PW-380, Idemitsu Kosan Co., Ltd.)

Comparative Examples 1 to 4

A sealing material was prepared in the same way as in Example 1, except that cell diameter control agents shown in Table 2 were used. The cell diameter control agent was used so that the thickness, the mean cell diameter, and the cell number of the rubber form with a closed cell structure are obtained in the same way as those in the sealing material in Example 1, in order to perform a cell breakage treatment under the same evaluation condition as in Example 1.

(Evaluation)
(1) Tensile Strength

The tensile strength of the rubber foams (when 300% elongated in a longitudinal direction of the foam) before the cell breakage treatment was measured pursuant to a method prescribed in JIS K 6767 (A method) by using a tensile strength tester (Autograph, manufactured by Shimadzu Corporation). The results are shown in Tables 1 and 2.

(2) 80% Compression Rigidity

80% compression rigidity of the rubber foams in the thickness direction of the foams before the cell breakage treatment was measured pursuant to a method prescribed in JIS K 6767 by using a rigidity tester (Autograph, manufactured by Shimadzu Corporation). The results are shown in Tables 1 and 2.

(3) Cell Breakage Treatment Property

The rubber foams before cell breakage treatment were subjected to a cell communication treatment. Thereafter, the conditions of the rubber foams were evaluated based on the following standard:

○: No cracks, fracture, nor deformation observed.
Δ: Small cracks, fracture and deformation observed.
X: Large cracks, fracture and deformation observed.

The results are shown in Tables 1 and 2.

(4) Sealing Property for Water Cut-Off

Figure 2:
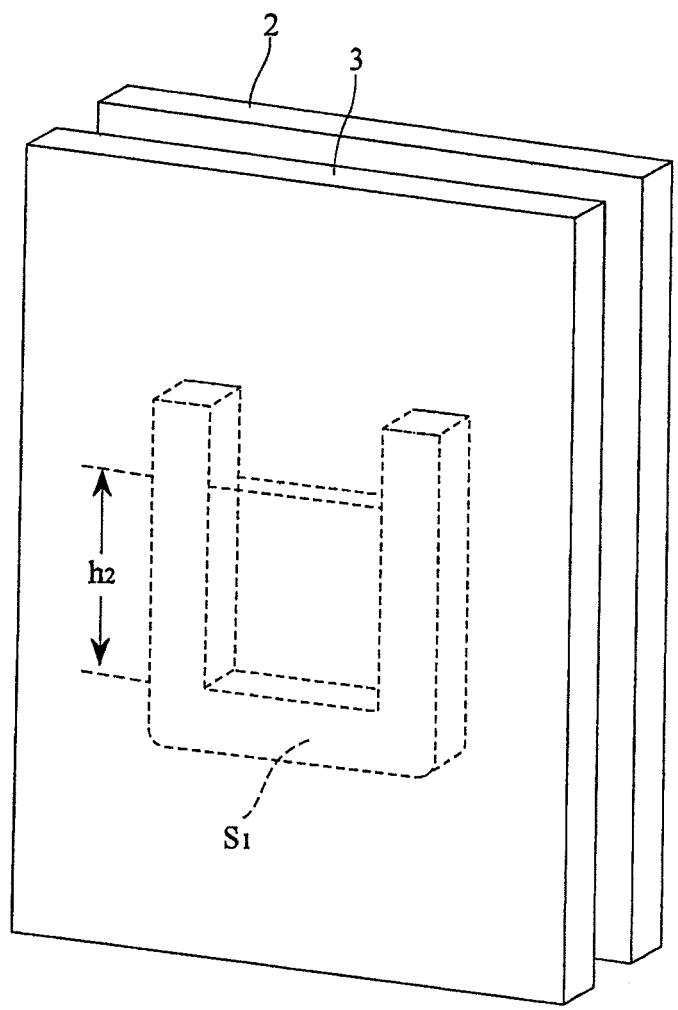
FIG. 2 is a diagram for generally explaining U-shaped test method for evaluating water cut-off property.

The sealing material which was subjected to cell breakage treatment was punched out to obtain a sample $S_1$ in the form of a U shape, as shown in FIG. 1, which has a thickness (a) of 10 mm, a width (e) of 10 mm, a height (f) of 130 mm, and an interval (g) between free ends of the sample of 45 mm. The sample $S_1$ was subjected to 80% compression in the thickness direction of the sample by using two acrylic boards 2 and 3 as shown in FIG. 2. Water was poured to the inside of the U shape to the level of 100 mm ($h_2$). The time period for water leakage being observed was measured. The results are shown in Tables 1 and 2.

TABLE 1

|  |  |  | Example 1 | Example 2 | Example 3 | Example 4 |
|---|---|---|---|---|---|---|
| Formulation [parts by weight] | rubber component | EPDM | 100 | 100 | 100 | 100 |
|  | blowing agent | azodicarbonamide | 25 | 25 | 25 | 25 |
|  | vulcanizing agent | sulfur | 2 | 2 | 2 | 2 |
|  | cell diameter control agent | calcium stearate | 0.1 | 0.5 | 1.5 | 5.0 |
|  |  | zinc stearate | 1.5 | 1.5 | 1.5 | 1.5 |
|  |  | stearic acid | 0 | 0 | 0 | 0 |
|  | filler | carbon black | 30 | 30 | 30 | 30 |
|  |  | calcium carbonate | 120 | 120 | 120 | 120 |

TABLE 1-continued

|  |  |  | | | | |
|---|---|---|---|---|---|---|
|  | resin softener | process oil | 40 | 40 | 40 | 40 |
|  |  | polybutene | 10 | 10 | 10 | 10 |
|  |  | rosin ester | 10 | 10 | 10 | 10 |
|  | vulcanization promoter | thiazole | 1.5 | 1.5 | 1.5 | 1.5 |
|  |  | dithiocarbamate | 1.5 | 1.5 | 1.5 | 1.5 |
|  |  | thiourea | 1.0 | 1.0 | 1.0 | 1.0 |
|  |  | dithiophosphite | 1.0 | 1.0 | 1.0 | 1.0 |
| Evaluation | tensile strength [kPa] |  | 54.9 | 54.9 | 67.1 | 57.9 |
|  | 80% compression rigidity [kPa] |  | 7.4 | 7.4 | 10.0 | 7.5 |
|  | cell breakage treatment |  | Δ | ○ | ○ | ○ |
|  | water cut-off property (period until leakage) |  | 3 hours | 20 hours | 24 hours No leakage | 24 hours No leakage |

|  |  |  | Example 5 | Example 6 | Example 7 | Example 8 |
|---|---|---|---|---|---|---|
| Formulation [parts by weight] | rubber component | EPDM | 100 | 100 | 100 | 100 |
|  | blowing agent | azodicarbonamide | 25 | 25 | 25 | 25 |
|  | vulcanizing agent | sulfur | 2 | 2 | 2 | 2 |
|  | cell diameter control agent | calcium stearate | 6.0 | 1.5 | 1.5 | 1.5 |
|  |  | zinc stearate | 1.5 | 0.1 | 0.5 | 5.0 |
|  |  | stearic acid | 0 | 0 | 0 | 0 |
|  | filler | carbon black | 30 | 30 | 30 | 30 |
|  |  | calcium carbonate | 120 | 120 | 120 | 120 |
|  | resin softener | process oil | 40 | 40 | 40 | 40 |
|  |  | polybutene | 10 | 10 | 10 | 10 |
|  |  | rosin ester | 10 | 10 | 10 | 10 |
|  | vulcanization promoter | thiazole | 1.5 | 1.5 | 1.5 | 1.5 |
|  |  | dithiocarbamate | 1.5 | 1.5 | 1.5 | 1.5 |
|  |  | thiourea | 1.0 | 1.0 | 1.0 | 1.0 |
|  |  | dithiophosphite | 1.0 | 1.0 | 1.0 | 1.0 |
| Evaluation | tensile strength [kPa] |  | 56.5 | 44.0 | 59.2 | 50.1 |
|  | 80% compression rigidity [kPa] |  | 7.2 | 8.1 | 9.1 | 6.8 |
|  | cell breakage treatment |  | Δ | ○ | ○ | Δ |
|  | water cut-off property (period until leakage) |  | 24 hours No leakage | 2 hours | 24 hours No leakage | 24 hours No leakage |

TABLE 2

|  |  |  | Comparative Ex. 1 | Comparative Ex. 2 | Comparative Ex. 3 | Comparative Ex. 4 |
|---|---|---|---|---|---|---|
| Formulation [parts by weight] | rubber component | EPDM | 100 | 100 | 100 | 100 |
|  | blowing agent | azodicarbonamide | 25 | 25 | 25 | 25 |
|  | vulcanizing agent | sulfur | 2 | 2 | 2 | 2 |
|  | cell diameter control agent | calcium stearate | 0 | 0 | 1.5 | 0 |
|  |  | zinc stearate | 1.5 | 1.8 | 0 | 0 |
|  |  | stearic acid | 0 | 0 | 0 | 2.5 |
|  | filler | carbon black | 30 | 30 | 30 | 30 |
|  |  | calcium carbonate | 120 | 120 | 120 | 120 |
|  | resin softener | process oil | 40 | 40 | 40 | 40 |
|  |  | polybutene | 10 | 10 | 10 | 10 |
|  |  | rosin ester | 10 | 10 | 10 | 10 |
|  | vulcanization promoter | thiazole | 1.5 | 1.5 | 1.5 | 1.5 |
|  |  | dithiocarbamate | 1.5 | 1.5 | 1.5 | 1.5 |
|  |  | thiourea | 1.0 | 1.0 | 1.0 | 1.0 |
|  |  | dithiophosphite | 1.0 | 1.0 | 1.0 | 1.0 |
| Evaluation | tensile strength [kPa] |  | 45.9 | 46.0 | 43.5 | 48.5 |
|  | 80% compression rigidity [kPa] |  | 6.9 | 6.9 | 8.1 | 5.2 |
|  | cell breakage treatment |  | x | x | ○ | Δ |
|  | water cut-off property (period until leakage) |  | 2 hours | 2 hours | 1 hour | 1 hour |

As shown in Table 1, calcium stearate as a fatty acid calcium salt, and zinc stearate as a fatty acid zinc salt were used in Examples 1 to 8. In these Examples, it was shown that rubber foams were obtained which were evaluated to have the cell breakage treatment property as Δ or more, and the water cut-off property exceeding one hour, in addition to excellent tensile strength and compression rigidity. It was also shown that the amount of the fatty acid calcium slat is preferably in the range of 0.1 to 6.0 parts by weight, and that the amount of the fatty acid zinc salt is preferably in the range of 0.1 to 5.0 parts by weight.

To the contrary, Comparative Examples 1 to 4 which do not include either one or neither of calcium stearate nor zinc stearate showed that rubber foams were obtained, with the foam breakage property evaluated as X or water cut-off property less than 1 hour.

The above discussion demonstrated that sealing materials having excellent water cut-off properties were obtained, according to the present invention, which do not have problems such as cracks.

EXPLANATION OF REFERENCE NUMERALS

S U-shaped sample
2, 3 Acrylic boards

The invention claimed is:

1. A sealing material prepared by vulcanizing and foaming a mixture comprising a rubber component comprising a copolymer rubber of ethylene, an α-olefin having 3 or more carbon atoms, and a non-conjugated diene, a vulcanizing agent, and a blowing agent, and then subjecting the mixture to a cell breakage treatment, characterized in that the mixture further comprises a fatty acid calcium salt and a fatty acid zinc salt,
 wherein the density of the sealing material is in the range of 0.03 to 0.12 g/cm$^3$, and
 wherein the content of the fatty acid calcium salt is in the range of 0.1 to 6.0 parts by weight, based on 100 parts by weight of the rubber component.

2. The sealing material as claimed in claim 1, wherein the fatty acid calcium salt is calcium stearate, and the fatty acid zinc salt is zinc stearate.

3. A sealing material prepared by vulcanizing and foaming a mixture comprising a rubber component comprising a copolymer rubber of ethylene, an α-olefin having 3 or more carbon atoms, and a non-conjugated diene, a vulcanizing agent, and a blowing agent, and then subjecting the mixture to a cell breakage treatment, characterized in that the mixture further comprises a fatty acid calcium salt and a fatty acid zinc salt,
 wherein the density of the sealing material is in the range of 0.03 to 0.12 g/cm$^3$, and
 wherein the content of the fatty acid zinc salt is in the range of 0.1 to 5.0 parts by weight, based on 100 parts by weight of the rubber component.

4. The sealing material as claimed in claim 1, wherein the copolymer rubber is contained in an amount of 20% by weight or more, based on the total amount of the rubber component.

5. The sealing material as claimed in claim 1, wherein the blowing agent is azodicarbonamide.

6. The sealing material as claimed in claim 1, wherein the vulcanizing agent comprises sulfur.

7. A method for preparing a sealing material by vulcanizing and foaming a mixture comprising a rubber component comprising a copolymer rubber of ethylene, an α-olefin having 3 or more carbon atoms, and a non-conjugated diene, a vulcanizing agent, and a blowing agent, and then subjecting the mixture to a cell breakage treatment, characterized in that the mixture further comprises a fatty acid calcium salt and a fatty acid zinc salt,
 wherein the density of the sealing material is in the range of 0.03 to 0.12 g/cm$^3$, and
 wherein the content of the fatty acid calcium salt is in the range of 0.1 to 6.0 parts by weight, based on 100 parts by weight of the rubber component.

8. The method for preparing a sealing material as claimed in claim 7, wherein the fatty acid calcium salt is calcium stearate, and the fatty acid zinc salt is zinc stearate.

9. A method for preparing a sealing material by vulcanizing and foaming a mixture comprising a rubber component comprising a copolymer rubber of ethylene, an α-olefin having 3 or more carbon atoms, and a non-conjugated diene, a vulcanizing agent, and a blowing agent, and then subjecting the mixture to a cell breakage treatment, characterized in that the mixture further comprises a fatty acid calcium salt and a fatty acid zinc salt,
 wherein the density of the sealing material is in the range of 0.03 to 0.12 g/cm$^3$, and
 wherein the content of the fatty acid zinc salt is in the range of 0.1 to 5.0 parts by weight, based on 100 parts by weight of the rubber component.

10. The method for preparing a sealing material as claimed in claim 7, wherein the copolymer rubber is contained in an amount of 20% by weight or more, based on the total amount of the rubber component.

11. The method for preparing a sealing material as claimed in claim 7, wherein the blowing agent is azodicarbonamide.

12. The method for preparing a sealing material as claimed in claim 7, wherein the vulcanizing agent comprises sulfur.

13. The sealing material as claimed in claim 1, wherein the sealing material comprises both an open cell structure and a closed cell structure after the cell breakage treatment, and the ratio of the closed cell structure in the sealing material is 1 to 10%.

14. The method for preparing a sealing material as claimed in claim 7, wherein the sealing material comprises both an open cell structure and a closed cell structure after the cell breakage treatment, and the ratio of the closed cell structure in the sealing material is 1 to 10%.

* * * * *